United States Patent [19]

Babcock

[11] Patent Number: 5,108,790

[45] Date of Patent: * Apr. 28, 1992

[54] METHODS OF APPLYING COMPOSITIONS OF NO MIX COMPOUNDS

[76] Inventor: H. Nash Babcock, 4 Quintard Ave., Old Greenwich, Conn. 06870

[*] Notice: The portion of the term of this patent subsequent to Mar. 22, 2005 has been disclaimed.

[21] Appl. No.: 199,556

[22] Filed: May 27, 1988

Related U.S. Application Data

[60] Continuation-in-part of Ser. No. 101,908, Sep. 28, 1987, Pat. No. 4,839,115, which is a division of Ser. No. 53,561, May 21, 1987, Pat. No. 4,732,782, which is a continuation-in-part of Ser. No. 843,316, Mar. 24, 1986, abandoned, and a continuation-in-part of Ser. No. 49,906, May 15, 1987, Pat. No. 4,747,878, which is a division of Ser. No. 843,316, Mar. 24, 1986, abandoned.

[51] Int. Cl.$^5$ ............... B05D 1/12; B05D 1/36; B28B 1/32; B32B 35/00

[52] U.S. Cl. .................. 427/204; 106/638; 106/692; 106/713; 106/737; 264/34; 264/35; 264/36; 264/112; 264/122; 264/240; 264/256; 264/259; 264/265; 264/308; 264/309; 264/333; 405/222; 405/266; 405/267; 427/136; 427/140; 427/180; 427/181; 427/201; 427/397.7; 427/403; 427/427

[58] Field of Search .............. 264/333, 109, 122, 42, 264/112, 113, DIG. 43, DIG. 57, DIG. 65, DIG. 72, 240, 256, 219, 31-299, 36, 336, 121, 259, 265, 308, 309, 267; 427/427, 180, 181, 140, 136, 403, 397.7, 201-205, 299, 314; 52/742; 405/266, 267, 222-224; 106/85, 89, 97, 638, 639, 713, 715, 733, 735, 692, 738, 694, 718, 737

[56] References Cited

U.S. PATENT DOCUMENTS

| | | |
|---|---|---|
| 188,123 | 3/1877 | Goodridge, Jr. .......... 405/222 |
| 358,853 | 3/1877 | Goodridge, Jr. .......... 405/222 |
| 722,782 | 3/1903 | Weaver . |
| 743,525 | 11/1903 | Lake .......... 264/DIG. 43 X |
| 930,086 | 8/1909 | Reed .......... 366/9 |
| 1,029,126 | 6/1912 | Hoover . |
| 1,047,680 | 12/1912 | Mills et al. . |
| 1,107,237 | 8/1914 | Smith . |
| 1,391,678 | 9/1921 | Francois .......... 405/266 |
| 1,473,990 | 11/1923 | Huber . |
| 1,920,463 | 8/1933 | Edwards . |
| 2,138,172 | 11/1938 | Johnson . |
| 2,306,962 | 12/1942 | Kropp .......... 259/11 |
| 3,088,713 | 5/1963 | Gard .......... 259/18 |
| 3,582,376 | 6/1971 | Ames .......... 106/90 |
| 3,665,720 | 5/1972 | Havno .......... 405/226 |
| 3,682,676 | 8/1972 | Karrh et al. .......... 117/16 |
| 3,683,760 | 8/1972 | Silva .......... 264/333 X |
| 3,725,105 | 4/1973 | Chase .......... 117/2 R |
| 3,730,763 | 5/1973 | Schlottmann et al. .......... 427/427 |
| 3,745,775 | 7/1973 | Kahn .......... 405/222 |
| 3,825,433 | 7/1974 | Arnaldi et al. .......... 106/809 |
| 3,914,359 | 10/1975 | Bevan .......... 264/DIG. 43 x |
| 3,922,832 | 12/1975 | Dicker .......... 52/742 |
| 3,927,163 | 12/1975 | Gabriel et al. .......... 264/DIG. 43 X |
| 3,955,992 | 5/1976 | Roberts .......... 106/90 |
| 4,042,407 | 8/1977 | Natsuume .......... 106/90 |
| 4,086,663 | 4/1978 | Croft .......... 366/154 |
| 4,129,449 | 12/1978 | Kujima .......... 405/266 |
| 4,175,867 | 11/1979 | Piazza .......... 366/9 |
| 4,243,696 | 1/1981 | Toth .......... 427/27 |
| 4,301,763 | 11/1981 | Goldstone et al. .......... 118/308 |
| 4,366,209 | 12/1982 | Babcock .......... 427/180 |
| 4,367,986 | 1/1983 | Miyoshi et al. .......... 405/266 |
| 4,374,672 | 2/1983 | Funston et al. .......... 106/97 |
| 4,390,372 | 6/1983 | Hardin .......... 106/90 |
| 4,461,856 | 7/1984 | Willis et al. .......... 523/401 |
| 4,472,201 | 9/1984 | Ochi et al. .......... 106/98 |
| 4,487,633 | 12/1984 | Sakuta et al. .......... 106/90 |
| 4,504,315 | 3/1985 | Allemann et al. .......... 106/89 |
| 4,732,781 | 3/1988 | Babcock et al. .......... 427/140 |
| 4,732,782 | 3/1988 | Babcock et al. .......... 427/427 |
| 4,747,878 | 5/1988 | Babcock et al. .......... 106/97 |
| 4,772,326 | 9/1988 | Heinen et al. .......... 106/85 |
| 4,839,115 | 6/1989 | Babcock et al. .......... 264/42 |

OTHER PUBLICATIONS

Nakahara et al., "The Prepacked Concrete in Water Using Artificial Extremely Fine Sand", The Cement Assoc. of Japan, Rev. of 27th Meetings, pp. 199-201 (May 1973).
Sakrete Concrete Mix Does it Best for Less, copyright 1981.
Sakrete®, Children's Play Yard.
The King of Concrete Article (Jul. 1986, World Fence News).
Set Consumer Products Inc., "Set . . . Hold It".
1950's Film-Popeye Cartoon.
SAT-Base II, Rapid Cure Cement Bag.
Quikrete, Rapid Road Repair Bag.
Quikrete, Quick Setting Cement Bag.
Quikrete, Post Concrete Mix Bag.
Sakrete's Project Booklet.
Quikrete Hydraulic Cement Bag.
Build and Repair with Concrete, The Complete Do-It-Yourself Manual, The Quikrete Companies, 1986, pp. 21-22.
Quikrete Hydraulic Water-Stop, Instant-Plub Cement Container.
Quikrete Quick-Setting Cement Container.
Quikrete Construction Products Brochure, 1987.
Quikrete Rapid Road Repair Brochure, 1984.

(List continued on next page.)

Primary Examiner—Karen Aftergut
Attorney, Agent, or Firm—Weingram & Zall

[57] ABSTRACT

Dry cementitious compositions and packages and methods for their application. The dry compositions do not have to be mixed with water but instead are poured, sprayed or troweled onto a substrate which contains water in an amount in excess of that necessary for the hydration of the cementitious materials. These compositions can be applied by layering, dropping through a conduit, or preferably, merely dropped into the water.

15 Claims, No Drawings

OTHER PUBLICATIONS

Gifford-Hill, Non-Shrink Grouts Brochure, 1988.
Master Builders, Master Flow 713 Grout Brochure, 1987.
Genstar Building Materials, Concrete Repair Center, Brochure.
Gifford-Hill Supreme Pre-Mixed Non-Shrink Grout Bag.
Master Builders Master Flow 713 Grout Bag.
Set, Quick Post.
Sakrete ®, Save with Sakrete ® Products.
Sakrete ®, 15 Easy Steps to Greater Home Enjoyment.
Quikrete ®, Do-It-Yourself Series-Treat Wet or Leaking Basement Walls.
Quikrete ®, Handyman . . . Complete Guide to Home Maintenance.
Quikrete ®, Do-It-Yourself-Projects with Cement Mixes.
Quikrete Package Pavement Company, Quikrete ® Do-It-Yourself Series, Setting Posts and Mixes & Their Use (3 pgs.), Sakrete 50th Anniversary Brochure.

METHODS OF APPLYING COMPOSITIONS OF NO MIX COMPOUNDS

CROSS REFERENCE TO RELATED APPLICATIONS

This application is (1) a continuation-in-part of application Ser. No. 101,908, filed Sep. 28, 1987, now U.S. Pat. No. 4,839,115, which is a division of application Ser. No. 053,561, filed May 21, 1987, now U.S. Pat. No. 4,732,782, which is a continuation-in-part of application Ser. No. 843,316, filed Mar. 24, 1986, now abandoned, and (2) a continuation-in-part of application Ser. No. 49,906, filed May 15, 1987, now U.S. Pat. No. 9,747,878, which is a division of application Ser. No. 843,316, filed Mar. 24, 1986, now abandoned.

TECHNICAL FIELD

The present invention relates to methods and compositions for the application or placement of cementitious compositions which do not require premixing with water.

BACKGROUND OF THE INVENTION

At present, it is essential that all cementitious compositions are mixed with water before placement in order to obtain the proper characteristics of the final product. Some type of mixing is and has always been required. Some manufacturers of premixes have put the dry premix in a hole and then recommended adding the water. Some have put premixes in bags and dropped the mixes while in bags through the water, then after the bags are in place, letting water penetrate through the bag to the mix. However, these systems have not allowed full hydration. Mortar mixers, concrete mixers, hand mixing or other types of wet mixing have been utilized to obtain a uniform distribution of the appropriate amount of water in the cement. According to the prior art, the quantity of water to be mixed with the cement must be controlled to a very narrow range, and too little or too much water will produce an ineffective or unusable material. Cementitious mixtures could not be placed in a dry state directly into water or upon a wet surface without first wetting and mixing the dry components.

SUMMARY OF THE INVENTION

The present invention relates to dry cementitious compositions which have finely divided particles of at least one cement binder. The cement may be Portland cement, gypsum, high aluminum cement, or mixtures thereof, but not restricted thereto. Magnesium phosphate or other fast setting compounds may also be used. The major proportion of particles have approximately the same drop rate in water, so that when poured through water according to the invention, the material does not appreciably segregate.

These compositions may further include a filler component of sand or aggregate particles, provided that the major portion of those particles have a drop rate in water which is approximately the same as the cement particles. Also, the cementitious mixture should be able to absorb and/or combine with water in the amount necessary to obtain hydration without mixing. Generally, the amount of water will range between about 20 to 80% by volume, with approximately 50% by volume being contemplated for the preferred formulations at this time. The higher the amount of water the cementitious mixture can tolerate, the better the finished product.

It is possible to use other additives in these compositions. Such additives may include, but are not limited to, accelerators, water reducing compounds, pumping aids, water absorbing compounds, waterproofing agents, polymers, drying shrinkage inhibitors, wet shrinkage inhibitors, lime, pigments, expanding agents, and the like, and may be added to improve or impart a particular property to the composition.

In placing cementitious mixtures, air voids may occur. To avoid this condition, rodding, stirring, vibrating or applications of pressure can be used to eliminate or reduce these air voids.

The invention also relates to a method for making these compositions. These methods include providing the cement binder in the form of finely divided particles and adjusting the drop rate of the major portion of particles to approximately the same range. Filler components, if added, are treated the same. When fillers are added, it is preferable to mix the dry ingredients to a homogenous consistency.

The invention also contemplates various methods for installing cement products upon a substrate which comprises saturating the substrate with an amount of water which is substantially in excess of the normal amount of dry components which are subsequently added. The dry powder is added without mixing in a manner such that it combines with a portion of the water and displaces the remainder of the water. The applied combination is then allowed to cure to final product.

Specific installation methods are further described hereinbelow.

DETAILED DESCRIPTION OF THE PREFERRED EMBODIMENTS

The invention relates to dry cementitious compositions which are poured, troweled or sprayed through excess water or onto wet surfaces without mixing to hydrate the cement component and obtain high strength products after setting and curing. Cementitious compositions of Portland cements, gypsums, high alumina cements, other specialty cements and combinations, as well as other chemicals such as magnesium phosphates, all have been successfully used, the only limitation being that at least one component of the cementitious composition is hydrated by or reacts with water.

By "cement binder" what is meant is a material, usually of a cementitious nature, which sets or cures upon contact with and hydration by water to form a solid mass which is useful for forming blocks, shapes, structures, walls, floors, or other surfaces for use as a supporting or load bearing member. The cement binder may be used alone or with various additives and fillers, usually sand or aggregate, to form the desired member after setting and curing. In addition to the well known cement binders, such as Portland cement, aluminous cement, gypsum and its variations, magnesium phosphate cements and the like, other materials, such as silicates, clays, cementitious waste products, or similar compounds which set and cure in a manner similar to Portland cements, are also contemplated as being within the scope of this term. Aluminum silicate is a specific example of this type material, and it is used for specialty applications due to its relatively high cost compared to the other materials previously mentioned.

When the formulations of these cementitious compositions are properly controlled, the problems of thorough wetting of the cement without overwetting, segregation of components, and loss of compressive strength of the cured product are greatly reduced or eliminated.

Where cement coatings are desired, the surface area to be coated is first prewetted and saturated with water. The dry cementitious mixture is placed on the surface, instantly reacting with the wet surface. If additional layers or a greater thickness of the coating is needed, the first cement layer can be prewetted and the dry compositions sprayed directly thereupon to increase the thickness and structural strength of the overall coating.

On horizontal surfaces, the area to be poured with cement is first flooded with water, then the dry cementitious compositions of the invention can be poured into the water. The excess water is displaced by the cementitious compositions, and the composition is then allowed to cure. This provides a fast, simple installation of cement without the need for tools, mixing apparatus, water measurements aids or the like. For floor levelings, for example, the floor can be flooded to form puddles in low areas. The dry cementitious composition is then sprinkled in the areas which puddles are formed, and allowed to cure. Thus, the floor is easily levelled by this procedure.

Another method for applying a dry cementitious composition upon a substrate includes the following steps. First a substrate is saturated with water in excess of that needed for hydration of a first dry cementitious composition which is to be applied. Next, a first layer of a hydrated cementitious composition is provided on the substrate by dropping a first dry cementitious composition having at least one cement binder in the form of finely divided particles into the water on the substrate without any type of physical mixing in a manner such that the first cementitious composition combines with a portion of the water to become hydrated without causing substantial dilution or segregation of the particles and wherein excess water, if any, is displaced from the substrate by the dropping of the dry composition thereinto. Next, additional water is provided upon the first layer to assure complete hydration of the cementitious composition and to provide water in excess of that needed for hydration of a second dry cementitious composition which is to be applied upon the first layer.

At least one second layer of a hydrated cementitious composition is then applied onto the first layer by dropping a second dry cementitious composition having at least one cement binder in the form of finely divided particles into the water without any type of physical mixing in a manner such that the second cementitious composition combines with a portion of the water to become hydrated without causing substantial dilution or segregation of the particles and wherein excess water, if any, is displaced from the substrate by the dropping of the dry composition thereonto. Next, additional water is applied, if necessary, to assure complete hydration of the composition of the second layer; and the hydrated layers are allowed to cure to a solid mass.

In this embodiment, it is advantageous for the first and second dry cementitious compositions to each ave a majority of particles which possess essentially the same drop rate to facilitate the application of the compositions to the substrate. Preferably, all particles of the first and second compositions should have essentially the same drop rate in water.

It is also possible for the first layer to predominantly comprise a filler and wherein the dry composition of at least one of the second layers comprises a sufficient amount of a cement binder to impart fast setting properties to the composition. In this embodiment, the first and at least one of the second layers can be applied to the substrate by pouring the dry compositions from a bag. A first portion of the composition in the bag would predominantly include the filler material, with a second portion including the cement binder. Thus, the first portion is applied as the first layer and the second portion is applied as one of the second layers.

If desired, this method may also include accelerating the setting and curing of at least one of the layers. One way to accomplish this cure accelerating step is to heat the water prior to dropping the dry composition thereinto. Alternatively, an accelerator compound may be added to the water or to the dry composition prior to dropping the dry cement composition into the water.

It is also possible for the cure accelerating step to include modifying the cement binder to increase its setting and curing properties. In this embodiment, the modified cement binder may be a Portland cement having an increased tricalcium aluminate content, with reduced dicalcium aluminate, gypsum, lime and iron oxide contents. Also, the modified cement binder may be a high alumina cement having an increased calcium to aluminate ratio to impart faster setting and curing times to the composition.

When the cementitious material is poured into the water on the substrate from a bag, the dry cementitious composition is packaged in a bag of a predetermined size and weight to facilitate transport, storage and handling. The dry composition in this bag would include a first portion of a cement binder and a filler wherein the filler is the predomimant component; and a second portion of the same cement binder and filler wherein the cement binder is the predominant component and is present in an amount sufficient to enable the composition to cure. In this composition, the total cement binder content of all portions preferably amounts to between about 5 and 95 weight percent, and more preferably, between about 10 and 50 percent by weight.

At least one of the first and second portions may include an additive of at least one surfactant, accelerator, water absorbing compound, water reducing compound, retarder, pumping aid, waterproofing agent, expanding agent, polymer or wet or drying shrinkage agent to impart a specific property to the composition, and the filler may be sand or aggregate.

It is also advantageous for the major proportion of particles in each portion to have approximately the same drop rate in water and that each portion be dry blended to a homogeneous consistency for optimum results.

Alternatively, the dry cementitous compositions can be pumped or sprayed onto a saturated substrate as described above. This provides the end user with a wide, versatile range of installation methods from which they can choose the most appropriate for a particular application or end use.

The drop rate of the particles of the cementitious compositions is controlled to achieve the desired effect when the particles are poured through water without any other form of mixing. The drop rate of the particles through water is dependent upon several factors of which the density or specific gravity is but one. Although important, balancing the density alone is insufficient to achieve a uniform drop rate sufficient to prevent segregation or dilution of the particles. The size, shape and surface characteristics of each of the particles used, both alone and relative to the other components, must be considered to assess the resistance of the particles dropping through water. For example, round or teardrop shaped particles drop faster through water than coarse, fat or irregular shaped particles, even if each have the same density.

Other variables can be controlled to improve the drop rate. Surfactants can be added to the water separately or along with the dry composition itself to overcome surface tension and assist in the dispersal of the particles through the water. The distance that the particles must fall through the water is also a consideration, with shorter distances allowing a greater tolerance of differing drop rates. Thus, the dry composition can be introduced by a layering method to achieve the entire desired thickness without having to be dropped a large distance through water. A conduit can be used to direct the dry materials underwater so as to effectively reduce its dropping distance through the water. Dry blending all ingredients to a uniform homogenous composition also assists in achieving a uniform drop rate as well as in an improvement in the consistency and properties of the cured composition.

All these factors must be considered and routine tests conducted to obtain a dry cementation system of components having balanced or similar drop rates so that no substantial segregation or substantial dilution of the particles occurs as the composition drops or falls through a quantity of water which is present in excess of that needed to hydrate the cement binder. Dropping the cement binder through the water assures that each cement article is hydrated without depending upon physical mixing.

In addition to the control of the drop rate of the particles, however, certain hydration agents can be included in the dry composition to assist in attaining a properly cured solid mass. By "hydration agent" we mean an additive or compound which enables the dry composition to tolerate the excess water when dropping therethrough.

For example, a hydration agent of a water absorbing compound can be added to the composition in an amount sufficient to absorb a portion of the excess water to prevent over-hydration of the cement binder and to prevent dilution or segregation of the particles. Additional cement has been found to be another suitable absorbing agent. Fine sand can also be used for this purpose. Anhydrous salts, clay, superslurpers, fly ash or other hydrophilic materials may be used under certain conditions. At this time, additional cement or a second cement binder is the east expensive water absorbing agent and for that reason is preferred.

Alternatively, an accelerator can be added to the dry ingredients, as the hydration agent in an amount sufficient to impart relatively fast hydration properties to the cement binder to enable the composition to rapidly set and cure before the excess water can cause over-hydration, dilution or segregation of the composition. The accelerator can be added to the dry mixture or separately into the water. Instead of utilizing a separate accelerator, it is also possible to modify conventional cementitious materials to achieve faster setting compositions.

In this regard, the hydration agent can be heat (used to raise the temperature of the water to increase the setting and curing time of the cement binder when dropping therethrough) or other additives, such as surfactants, which enable the composition to drop through the water more easily. Furthermore, the use of pure or clear water is not required, since the invention is operable in polluted or contaminated water or even seawater, since the method of dropping the cement binder particles through the water, rather than by physical mixing, assures that each particle becomes hydrated properly.

In Portland cement, one or more of the following changes would decrease the setting time of the mix and eliminate the need for the addition of accelerators:

1) increase the tricalcium aluminate ($3CaO\ Al_2O_3$) content to at least about 15% by weight of the clinker; In doing this, it is advantageous to reduce the dicalcium silicate ($2CaO\ SiO_2$) content accordingly. Also, it is suggested to maintain the iron oxide ($Fe_2O_3$) content as low as possible to avoid the formation of tetracalcium alumino ferrite ($4CaO\ Al_2O_3\ Fe_2O_3$)

2) maintain the free lime (CaO) content as low as possible.

3) do not add gypsum ($CaSO_4$) or reduce the amount of gypsum added during the grinding stage. A preferred replacement is a carbonate compound such as sodium carbonate or an alkali metal sulfate other than calcium, such as sodium or magnesium sulfate. It is also possible to obtain advantageous compositions by utilizing a different form of gypsum, such as the hemihydrates, instead of the anhydrous or dihydrate forms presently in use.

High alumina cement ("HAC") can also be modified by increasing the percentage of $C_{12}A_7$ i.e., $12CaO\ 7Al_2O_3$, present. This will avoid the need for accelerators such as the lithium carbonate which is normally used.

Controlling the rate of hydration leads to many applications. For instance, for coating vertical surfaces, a very fast setting material can be used to eliminate the problems of running, sagging or failure to bond. Where mortar for bricklaying is desired, a material with a long set time will allow the operator sufficient time to work with the material. For situations where the surface particles have not been properly wetted, additional water may be applied to the surface or upon the dry composition for more activation of the hydration reaction and further finishing.

In the past, there has always been difficulty in controlling the amount of water for the patching of highways or other horizontal surfaces. This problem is solved by this invention because the amount of water is controlled by the formulation of the dry cementitious composition itself. For example, water can be placed into a footing, post hole, mortar joint or tub, or pothole and then the dry cementitious material may be paced by pouring, spraying, or screening into the cavity until the desired level is reached. Excess water, if present, is displaced from the hole by the dry material. The rate of setting of the cementitious mixture can be designed to meet the needs of the particular application. The amount of water required depends on the specific composition and application used. After the hoe is filed, a plywood board or similar member can be placed on top to level the upper surface.

For the placement of concrete foundations, a hole is first prepared, then filled with the required amount of water. If desired, forms can be used to help contain the water. The dry material can then be poured directly into the foundation area to the desired height, thus displacing the excess water, if any. After the material cures, the foundation is complete.

It is also possible to control the depth of water through which the dry composition has to drop. This enables the desired thickness to be built up in steps or layers, with a certain thickness less than the total desired being achieved in each step or layer by dropping the dry composition into the water.

In certain circumstances, a cavity could have a small percentage of water placed into it and then the first part of the cementitious mixture dropped into the water. While this placement is taking place, additional water could then be placed into the hole by various methods simultaneously with the placement of the rest of the cementitious mixture. When the final quantity of the cementitious mixture is reached, the entire surface area could be sprayed for troweling or other finishing purposes as could be done when the entire mixture is poured through water.

In the situation where the cavity is porous and cannot hold water, it is possible to thoroughly wet the surfaces of the hoe and then introduce a fast setting cementitious mixture. It is then possible to provide excess water in the lined hoe and proceed as above.

The control of density, shape and size of the dry components and their rate of dropping through water is essential for the proper performance of the cementitious mixtures. The ability to use materials of various sizes and densities, whose drop rate would otherwise be higher if a slow setting cementitious mixture was used, is enhanced by the increased rate of the water activation of the cementitious parties to form a homogeneous mixture.

The use of specific cementitious compositions may be varied or adjusted to meet the needs of the particular application. The most ideal situation is to balance the drop rate for all the dry ingredients and to control the setting time of the cement so that all particles will be properly hydrated and integrated with the aggregates, if any. In this manner, masonry walls can be built up with dry mortars which are hydrated after installation. Precast and prestressed sections are put in place, the dry mixture is placed in water in the joints and the surface can be wetted down for complete activation of the cement binder. The setting time of the binders can be accelerated to a few seconds or slowed up for days, depending upon the selection of cement component.

The system can be used with any normal additives acceptable to the specific composition. In some compositions, e.g., those based on 100% by weight of one or more cement binders, no separate hydration agent is required. Furthermore, these compositions may contain numerous chemicals or additives that are compatible to the system for the purpose of improving or imparting certain properties. Additives such as accelerators, water reducers, bonding agents, curing agents, or pumping or waterproofing aids may be added to the compositions of the invention. These additives or modifying agents can be added to the water or to the cement mix, in any order or combination. The amounts or types of such additives may have to be modified from conventional usages taking into account the setting and curing times for the specific composition.

The examples show the success of adding cementitious compositions to water after the water is in place.

When dry, preblended materials are used, there is a much greater potential for higher quality finished product.

If aggregates are found to be too heavy, smaller aggregates or lighter weight aggregates can be used to keep the drop rate of the overall system in balance.

The present invention provides the following:
1. Dry cement can be used.
2. Cement and sand can be used.
3. Cement, sand and aggregates can be used.
4. All types of cements can be used.
5. All types of cementitious particles, such as gypsums, limes and so forth can be used.
6. All types of chemical cements, even with water soluble parts, can be used.
7. No wet mixing or blending equipment is required.
8. No addition of water to mixes is required before placement, avoiding all equipment costs and clean up.
9. When placements under deep water conditions where tremes, elephant trunks or pipes would be required, the material under this formula can be placed dry in the tube and activated by available water at the end of the line, thus keeping all conveyances clear of wet cement.
10. When cement contents are too low in the mixtures to permit proper strength development or prevent overadsorption of water, weak or segregated mixes can result. More cement may be added, or a water absorption material may be added, to prevent excess water from decreasing the quality of the mix.

The amount of cement binder to be used in the compositions and methods of the invention should be that which is sufficient to impart strength to composition so that it can perform in the intended application. A cement binder of at least 5 weight percent is sufficient for many applications, although about 10 to 20% or more is preferred.

Present cement mixes with less than 20% of a cementitous binder should have some additional water absorption agent in the mix to prevent overwatering and segregation. Alternatively, a fast setting cementitious mixture or composition containing an accelerator can be used to allow the cement to set before the excess water causes segregation or dilution thereof. Ideally, cementitious compositions of the mixtures should have the maximum amount of water absorbency possible. The higher the ratio of chemically bonded water to the binder, the better and more versatile a product will be achieved.

Cementitious mixtures containing more than 20% cement may or may not need additional cement or water absorbers, or accelerators, depending on the application.

EXAMPLES

The scope of the invention is further described in connection with the following examples which are set for the sole purpose of illustrating the preferred embodiments of the invention and which are not to be construed as limiting the scope of the invention.

In the examples that follow, the components of each cementitious composition were manufactured of finely divided particles having substantially the same drop rate in water, so that the advantages previously discussed could be achieved.

The first 9 of the following examples are cementitious materials that were poured into a 4"×8" cylinder which was half filled with water. The material was poured until it reached a level near the top of the cylinder (i.e., from about ½" below to slightly above). The mixture was leveled to assure that no air pockets were present in the cylinder, additional water was added if dry powder remained at the top, and the cementitious composition was then allowed to cure.

| Example 1. (Comparative) Substance (common sand/cement mix) | Percentage |
|---|---|
| Portland Cement Type I | 20% |
| Sand | 80% |

Set time is 20 hours.
Compressive strength at 24 hours is 0.0 psi (too little cement and no absorbing or accelerating agent)

| Example 2. Substance | Percentage |
|---|---|
| Portland Cement Type I | 90% |
| Sand | 10% |

Set time 12 hours.
Compressive strength at 24 hours is 1,100 psi.

| Example 3. Substance | Percentage |
|---|---|
| Portland Cement Type I | 50% |
| Sand | 50% |

Set time 16 hours.
Compressive strength at 24 hours is 600 psi.

| Example 4. (Comparative) Substance | Percentage |
|---|---|
| Portland Cement Type I | 50% |
| Pea Gravel | 50% |

Set time 16 hours.
Compressive strength at 24 hours is 0.0 psi. (different drop rates).

| Example 5. Substance | Percentage |
|---|---|
| Portland Cement Type II | 50% |
| Plaster of Paris | 50% |

Set time is 10 minutes.
Compressive strength at 24 hours is 1,600 psi.

| Example 6. Substance | Percentage |
|---|---|
| High Alumina Cement | 80% |
| Sand | 20% |

Set time is 12 hours.
Compressive strength at 24 hours is 1,100 psi.

| Example 7. (Comparative) Substance | Percentage |
|---|---|
| High Alumina Cement | 20% |
| Sand | 80% |

Set time is 20 hours.
Compressive strength at 24 hours is 0.0 psi. (too little cement and no absorbing or accelerating agent).

| Example 8. Substance | Percentage |
|---|---|
| High Alumina Cement | 25% |
| Portland Cement Type III | 25% |

| Example 8. Substance | Percentage |
|---|---|
| Lithium Carbonate | 1% |
| Sand | 49% |

Set time is 5 minutes.
Compressive strength at 24 hours is 1,100 psi.

| Example 9. Substance | Percentage |
|---|---|
| Magnesium Oxide | 30% |
| Ammonium Phosphate | 10% |
| Sand | 60% |

Set time is 5 minutes.
Compressive strength at 24 hours is 1,100 psi.

The following examples were based upon the preparation of cubes from a cube mold which was half filled with water and to which the dry cementitious components were added in the same manner as above.

EXAMPLES 10-15

The following formulations were prepared. All proportions are given in weight percent unless otherwise noted.

| Components | Example 10 | 11 | 12 | 13 | 14 |
|---|---|---|---|---|---|
| Portland cement Type I | 90 | 90 | 90 | — | — |
| sodium carbonate | 5 | 5 | 10 | 10 | 10 |
| potassium chloride | 5 | — | — | — | — |
| magnesium formate | — | 5 | — | — | — |
| gypsum free Portland cement | — | — | — | 90 | 50 |
| sand | — | — | — | — | 40 |

These formulations were tested for set time and early strength with results shown in Table A below.

TABLE A

| Example | Initial Set (min.) | Final Set (min.) | 1 Day Strength (psi) | 3 Day Strength (psi) | 7 Day Strength (psi) |
|---|---|---|---|---|---|
| 10 | 3 | 76 | 1,250 | — | — |
| 11 | — | 15 | 250 | — | — |
| 12 | 5 | 14 | 775 | — | 1,300 |
| 13 | 4 | 6 | — | 2,200 | — |
| 14 | 7 | 9 | — | 1,925 | — |

These examples illustrate that various accelerators can be added to the dry cement mix prior to dropping the mix into the water.

EXAMPLE 15

In this example, a dry composition of 19.7% aluminous cement, 40% Portland cement, 40% sand and 0.3% lithium carbonate was prepared and preblended. This formulation was dropped into water at various temperatures to determine the effect that temperature of the water has on the final set time of the mix. Results are as follows:

| Water Temperature (°F.) | Final Set (Min.) |
|---|---|
| 70 (tap) | 8 |
| 110 (tap) | 5 |
| 180 (tap) | 3 |
| 32 (salt) | 19 |
| 45 (salt) | 15 |

-continued

| Water Temperature (°F.) | Final Set (Min.) |
|---|---|
| 62 (salt) | 14 |
| 80 (salt) | 10 |
| 108 (salt) | 6 |

These examples illustrate the use of heat as a set or cure accelerator. Also, the invention is operable with salt or polluted water instead of fresh tap (i.e., potable) water.

EXAMPLES 16-20

100% Portland cement Type I was poured into water containing a saturated solution of the following accelerators:

| Example | Accelerator(s) |
|---|---|
| 16 | 50:50 mix sodium formate/sodium carbonate |
| 17 | calcium chloride |
| 18 | potassium fluoride |
| 19 | calcium formate |
| 20 | sodium carbonate |

Results on set time and early strength are shown in Table B.

TABLE B

| Example | Initial Set (min.) | Final Set (min.) | 1 Day Strength (psi) | 3 Day Strength (psi) | 7 Day Strength (psi) |
|---|---|---|---|---|---|
| 16 | — | — | 700 | 2,350 | 2,625 |
| 17 | 120 | — | — | — | — |
| 18 | 10 | — | — | — | — |
| 19 | 10 | 13 | 250 | — | — |
| 20 | 60 | 6 | 700 | 1,650 | 2,175 |

This illustrates that solid accelerator compounds can be added to the water rather than to the dry cement mixture.

EXAMPLE 21

A formulation of neat Portland cement of particles having the same drop rate was poured into a 90% water/10% triethanolamine mixture. The triethanolamine acts as an accelerator so that the following properties were obtained.

| INITIAL SET | FINAL SET | EARLY STRENGTH | 1 DAY STRENGTH |
|---|---|---|---|
| 3 minutes | 8 minutes | 2 hours 100 PSI | 275 PSI |

This example illustrates the ability of the invention to be operable with a liquid accelerator added to the water rather than to the dry cement.

EXAMPLE 22

The following example illustrates the modification of a high alumina cement to achieve the desired results of the invention.

| Substance | FORMULA A | FORMULA B |
|---|---|---|
| Portland Cement Type I | 40% | 40% |
| "O" Sand | 40% | 40% |
| Conventional High Alumina Cement | 20% | — |
| Modified High Alumina Cement with increased $C_{12}A_7$ | — | 20% |
| Final Set time | 8 minutes | 3 minutes |
| 1 Hour Compressive Strength Time | zero | 250 PSI |

EXAMPLES 23-30

The following examples were based upon the preparation of two-inch cubes from a cube mold half filled with water and to which the dry cementitious compositions were added in the same manner as in Examples 1-9.

Example 23

| Substance | Percentage |
|---|---|
| Portland Cement Type I | 16% |
| P40 Sand | 84% |

One Day Strength = 75 psi

Example 24

| Substance | Percentage |
|---|---|
| Portland Cement Type I | 16% |
| P40 Sand | 83% |
| *JM Micro-Cel | 1% |

One Day Strength = 150 psi

Example 25

| Substance | Percentage |
|---|---|
| Portland Cement Type I | 16% |
| P40 Sand | 74% |
| Montour's Fly Ash | 10% |

One Day Strength = 250 psi

Example 26

| Substance | Percentage |
|---|---|
| Portland Cement Type I | 16% |
| P40 Sand | 73% |
| *JM Micro-Cel | 1% |
| Montour's Fly Ash | 10% |

One Day Strength = 325 psi

Example 27

| Substance | Percentage |
|---|---|
| Portland Cement Type I | 15% |
| P40 Sand | 85% |

One Day Strength = 50 psi

Example 28

| Substance | Percentage |
|---|---|
| Portland Cement Type I | 15% |
| P40 Sand | 84% |
| *JM Micro-Cel | 1% |

One Day Strength = 75 psi

Example 29

| Substance | Percentage |
| --- | --- |
| Portland Cement Type I | 15% |
| P40 Sand | 75% |
| Montour's Fly Ash | 10% |

One Day Strength = 175 psi

Example 30

| Substance | Percentage |
| --- | --- |
| Portland Cement Type I | 15% |
| P40 Sand | 74% |
| *JM Micro-Cel | 1% |
| Montour's Fly Ash | 10% |

One Day Strength = 225 psi
*JM Micro-Cel is a Johns-Manville product. It is a synthetic calcium silicate with an extraordinarily high liquid absorption capacity because of its very high surface area. However, it is not a hydraulic cement.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A method for applying a dry cementitious composition upon a substrate which comprises:
   saturating a substrate with water in excess of that needed for hydration of a first dry cementitious composition which is to be applied;
   applying a first layer of a hydrated cementitious composition onto the substrate by dropping a first dry cementitious composition having at least one cement binder in the form of finely divided particles into the water without any type of physical mixing in a manner such that the first cementitious composition combines with a portion of the water to become hydrated without causing substantial dilution or segregation of the particles and wherein excess water is displaced from the substrate by the dropping of the dry composition thereto;
   providing additional water upon the first layer to assure complete hydration of the cementitious composition and to provide water in excess of that needed for hydration of a second dry cementitious composition which is to be applied upon the first layer;
   applying at least one second layer of a hydrated cementitious composition onto the first layer by dropping a second dry cementitious composition having at least one cement binder in the form of finely divided particles into the water without any type of physical mixing in a manner such that the second cementitious composition combines with a portion of the water to become hydrated without causing substantial dilution or segregation of the particles and wherein excess water is displaced from the substrate by the dropping of the dry composition thereto;
   assuring complete hydration of the cementitious composition of the second layer; and allowing the hydrated layers to cure to a solid mass.

2. The method of claim 1 where at least one of the dry compositions is directed into the water by a conduit to minimize the distance that the dry composition must drop through the water.

3. The method of claim 2 wherein the dry composition is formulated with a majority of particles having essentially the same drop rate in water in order to increase the distance that the dry composition drops through the water without substantial segregation or dilution thereof.

4. The method of claim 1 wherein the first and second dry cementitious compositions each have a majority of particles which possess essentially the same drop rate in water to facilitate the application of the compositions to the substrate.

5. The method of claim 4 wherein most of the particles of the first and second compositions have the same drop rate in water.

6. The method of claim 1 wherein the first layer comprises a filler and wherein the dry composition of at least one of the second layers comprises an amount of cement binder sufficient to impart fast setting properties to the composition.

7. The method of claim 6 wherein the first and at least one of the second layers are applied to the substrate by pouring the dry first and second compositions from a bag into the water, wherein the first composition includes the filler material and the second composition includes the cement binder, wherein the first and second compositions form first and second portions within the bag, whereby the first portion is poured from the bag and applied as the first layer, and the second portion is poured from the bag and applied as one of the second layers.

8. The method of claim 1 which further comprises accelerating the setting and curing of at least one of the layers.

9. The method of claim 8 wherein the accelerating step comprises heating the water prior to dropping the dry composition thereinto.

10. The method of claim 8 wherein the accelerating step comprises incorporating an accelerator compound into the water prior to dropping the dry cement composition thereinto.

11. The method of claim 8 wherein the accelerating step comprises adding an accelerator to the dry composition prior to dropping same into the water.

12. The method of claim 8 wherein the accelerating step comprises modifying the cement binder to increase its setting and curing properties.

13. The method of claim 12 wherein the modified cement binder is a high alumina cement having an increased calcium to aluminate ratio to impart faster setting and curing times to the composition.

14. The method of claim 12 wherein the modified cement binder is a Portland cement having an increased tricalcium aluminate content.

15. The method of claim 14 wherein the modified Portland cement has reduced dicalcium aluminate, gypsum, lime and iron oxide content compared to conventional Portland cement.

* * * * *